United States Patent

[11] 3,561,794

| [72] | Inventors | Charles L. Dobbelaere;<br>Michael J. Rafalski, Jr., South Bend, Ind. |
|---|---|---|
| [21] | Appl. No. | 816,944 |
| [22] | Filed | Apr. 17, 1969 |
| [45] | Patented | Feb. 9, 1971 |
| [73] | Assignee | M. B. Skinner Company, Division of the Fanner Manufacturing Company, Division of Textron Inc.<br>Providence, R.I.<br>a corporation of Delaware |

[54] INSULATION GASKET
9 Claims, 4 Drawing Figs.

[52] U.S. Cl. ........................................... 285/52,
285/382.7
[51] Int. Cl. ........................................... F16l 11/12

[50] Field of Search........................................... 285/52,
354, 348, 382.7, 48, 50, 51, 53, 54

[56] References Cited
UNITED STATES PATENTS
| 931,950 | 8/1909 | Mueller....................... | 285/354X |
| 2,148,036 | 2/1939 | Pfefferle....................... | 285/354X |

FOREIGN PATENTS
| 779,832 | 3/1968 | Canada ........................ | 285/52 |

*Primary Examiner*—Dave W. Arola
*Attorney*—Merriam, Marshall, Shapiro & Klose

ABSTRACT: An insulation device for electrically insulating, sealing, and securing fluid conducting conduit members. The device preferably comprising a tubular sleeve and a plastic skirt disposed about a portion of the sleeve.

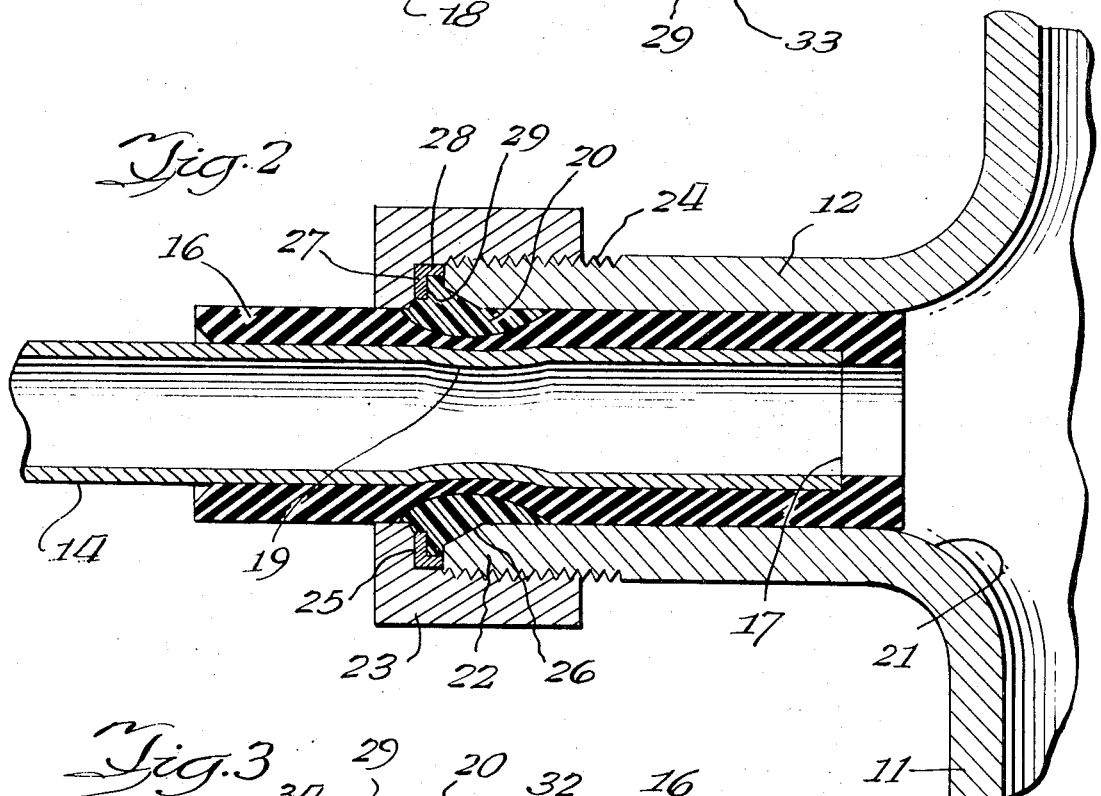

INSULATION GASKET

BACKGROUND OF THE INVENTION

The present invention relates generally to an insulating device employed in connecting fluid conduit members.

In the distribution of such fluids as natural gas, the gas is transported in large gas distribution lines. When it is desired to remove gas from the distribution line at a particular location, as for example, to provide gas service to a home or other type building, the gas distribution line can be tapped by welding or clamping a T-fitting to the distribution line. A tapping punch, such as shown in U.S. Pat. No. 2,990,731, can be employed for tapping a hole into the distribution line whereby gas in the distribution line passes through the opening made by the punch and through the T-fitting into the service line, which is connected at one end to the T-fitting.

In connecting the service line to the T-fitting it has been found that a number of problems exist with connecting devices presently utilized in the industry. In making a connection between the service outlet end of a T-fitting and a service line, which is usually made of copper or steel, an insulating gasket has been employed to act as an electrical insulator and sealing means between the T-fitting and service line. One device that has been utilized comprises a tubular rubber sleeve with a bead made of rubber molded about a portion of the sleeve. Upon installation, one end of the sleeve is inserted over one end of the service line while the other end of the sleeve is inserted inside the outlet end of the T-fitting so that the molded bead portion of the insulating gasket is seated against the outlet end of the T-fitting. A nut is then turned and drawn up, against, and around the bead to complete the connection of the service line and T-fitting.

Unfortunately, in many cases, when the nut is turned to complete the connection, the threads on the nut cut into, tear, and deform the molded rubber bead. This not only adversely affects the electrical insulating characteristics of the insulating gasket but also reduces its ability to provide a leak free connection between the service line and T-fitting outlet.

Another feature which is important with insulating devices used for connecting service lines and T-fittings is the so called "pullout" characteristics of the insulating gasket. This characteristic relates to the ability of an installed service line to withstand being pulled away from the insulating gasket and, hence, the T-fitting on the main distribution line. An insulating gasket which can withstand a high pull before the service line is pulled away is quite desirable in the industry.

Previously, it had been considered that in order for an insulating gasket to achieve this high "pullout" characteristic, it was necessary to reduce the wall thickness of the sleeve of the insulating gasket. However, upon reducing the wall thickness of the sleeve, to enhance the "pullout" characteristics of the gasket, it was found that the corresponding insulating properties of the gasket were substantially reduced.

SUMMARY OF THE INVENTION

In an effort to obviate the problems inherent with conventional insulating gaskets used in connecting service lines to T-fittings, we have invented a new and unobvious insulating gasket which has improved "pullout" characteristics, while at the same time suffering no reduction in insulating and sealing properties. Additionally, the problem previously encountered with cutting, tearing, and deforming the gasket has been greatly minimized.

The insulating gasket of the present invention comprises a tubular sleeve generally made of rubber and a plastic skirt disposed about a portion of the sleeve. The skirt, which can be made of nylon or like material, is much harder than the rubber bead used in the prior art, so that upon installation there is no cutting or tearing of the skirt. Moreover, the coefficient of friction of the nylon or plastic skirt is substantially less than that of the rubber bead, which likewise tends to reduce the cutting and tearing of the skirt. In addition, it has been found that the "pullout" characteristics of the insulating gasket of the present invention are greatly improved without impairment of the insulating properties of the gasket sleeve. In fact, it has been found that with the present invention these insulating properties of the gasket sleeve can be substantially increased.

Other features and advantages are inherent in the subject matter disclosed and claimed herein, as will become apparent to those skilled in the art from the following detailed description including the accompanying illustrative drawings, wherein:

FIG. 1 is a vertical partial view illustrating a T-fitting having a tubular outlet to which is connected a service line by means of the insulating gasket of the present invention;

FIG. 2 is an enlarged, vertical fragmentary sectional view of the T-fitting, service line, and insulating gasket of FIG. 1;

FIG. 3 is a side fragmentary view of the insulating gasket of the present invention having the service line inserted in one end of the gasket; and FIG. 4 is an enlarged perspective view of the skirt of the insulating gasket of the present invention with a portion of the skirt being cut away.

Referring now to the drawings and more particularly to FIG. 1, there is shown a T-fitting 10 having tubular portions 11 and 12. Tubular portion 11 has one end 18 which is externally threaded and adapted to be received by the internal threads of a clamp that has been attached to a gas distribution line (not shown).

A tapping punch (not shown) is disposed within portion 11 and is utilized to tap an opening into the gas distribution line. Gas will then pass from the distribution line through the tapped opening and through tubular portion 11 into tubular portion 12. Cap 13 prevents the gas from escaping through the cap end of the T-fitting. The gas, after passing through portion 12, passes into service line 14 which is connected to the outlet end of portion 12 by means of insulating gasket 15.

Referring now generally to FIGS. 2, 3, and 4, insulating gasket 15 comprises a sleeve 16 made of rubber and an annular skirt 20 positioned on the tubular sleeve 16. The skirt 20 is preferably made of nylon, although other plastic materials such as teflon, ABS, and the like can be used if desired.

In assembly, service line or conduit 14 is inserted in sleeve 16 to form a tight fit. Sleeve 16 has an inner flange 17 located contiguous to one end of the sleeve, the flange serving as a stop which limits the distance conduit 14 can be inserted into sleeve 16. Sleeve 16, as seen in FIG. 2, is positioned within tubular portion 12. The sleeve can be inserted until a stop, located on the inner wall 21 of portion 12, is reached.

In those instances where there is no stop on wall 21, skirt 20 can be positioned at a desired location along the tubular length of sleeve 16 such that upon insertion of sleeve 16 into portion 12, the sleeve will advance until skirt 20 seats against end 22 of portion 12.

Nut 23 is advanced and drawn up on tubular portion 12 by rotating nut 23 about external threads 24 of portion 12. As nut 23 advances toward end 22, skirt 20 is compressed and deformed as seen in FIG. 2, whereby part of the compressive force acting upon skirt 20 is transmitted to sleeve 16 and conduit 14. Conduit 14, which is generally made of copper and is quite ductile, will thereby become crimped as shown at 19 in FIG. 2.

In many instances it has been found desirable to place a steel washer 27, having flange 28, between nut 23 and face 29 of skirt 20. Such a washer prevents material of skirt 20 from becoming trapped between the inner wall 25 of nut 23 and end 22 of portion 12, thusly insuring a proper seating of skirt 20.

Skirt 20, which is substantially smaller in length than sleeve 16, has an inner wall 30 and a convex-shaped outer wall 31 which is tapered inwardly and arcuately from edge 33 of the large circumference, flat surfaced end 34, toward the reduced circumference of remaining end 32. By providing the arcuate taper on skirt 20, it has been found in assembly as illustrated in FIG. 2 that a portion of the skirt will, upon drawing up of nut 23 about portion 12, be wedged under and against wall 26 of portion 12, which aids in improving sealing ability and increases the compressive force acting on the insulating gasket of the present invention.

Where a maximum wall thickness of only about three thirty-second inch was possible with a prior art rubber beaded insulating gasket when used with a particular size T-fitting, the wall thickness of sleeve 16 can be increased to about one-eighth inch or varied within reasonable limits thereof with the insulating gasket of the present invention when used with the same size T-fitting. This increased wall thickness is extremely desirable in that it correspondingly increases the electrical insulation capacity of the insulating gasket of the present invention.

Surprisingly, it has also been found that in increasing the wall thickness of insulator sleeve 16, the "pullout" characteristics of the assembly have improved significantly. This is surprising due to the fact that in the prior art arrangements the wall thickness of the insulator sleeve and, hence, its corresponding electrical insulation capacity, was thought to be necessarily inversely proportional to the "pullout" strength of the assembly.

For example, an insulating gasket of the present invention having a wall thickness of about one-eighth inch was found to have a "pullout" strength, based on "pullout" tests, which was several hundred pounds greater than a conventional device having a rubber sleeve with a rubber bead molded thereto and with a sleeve wall thickness of about one-sixteenth inch. As a result, the sleeve wall thickness of the insulating gasket of the present invention was about doubled over the conventional device, thereby enhancing the electrical insulating characteristics of the gasket and, at the same time, significantly increasing the "pullout" characteristics of the device of the present invention.

It has also been found that where the skirt of the insulating gasket of the present invention was molded in shape by means of an injection molding process as opposed to machining the outer wall surface of the skirt, the "pullout" characteristics improved significantly in comparison to a gasket where the outer wall surface of the skirt had been machined. It is believed that machining the outer wall surface of the skirt tends to harden the skirt wall and adversely affect the ability of the skirt to flow in assembly.

The foregoing detailed description has been given for clearness of understanding only and no unnecessary limitations should be understood therefrom, as modifications will be obvious to those skilled in the art.

We claim:

1. An insulating gasket adapted for use in providing a leak free connection between a first conduit means and a second conduit means which are secured by a fastening means, said first conduit means having a larger inner diameter than the outer diameter of said second conduit means and adapted to receive at least a portion of said second conduit means, said first conduit means having an inner wall which is tapered inwardly from the end of said first conduit means adapted to receive said gasket;

said gasket consisting essentially of a tubular sleeve and a plastic, nonelastomeric skirt;

said sleeve being made of an elastomeric, insulating material having an outer wall, an inner wall and two ends;

said sleeve being adapted to be received within said first conduit means for at least a portion of the length of said sleeve;

said sleeve being adapted to receive said second conduit means whereby a portion of the outer wall of said second conduit means is covered by said sleeve and a portion of said sleeve covered second conduit means is disposed within said first conduit means;

said skirt comprising an outer wall, an inner wall and first and second ends;

said skirt being substantially smaller in length than the length of said sleeve and said outer wall of said skirt being sloped inwardly in a direction from said first end toward said second end;

said skirt being positioned on said sleeve intermediate the ends of said sleeve with said second end of said skirt being adjacent said tapered inner wall of said first conduit means; and said fastening means being adapted to be positioned adjacent said first end of said skirt whereby, upon securement of said first and second conduit means, said sloped wall of said skirt contacts said tapered wall to create a force component along the radial axis of said second conduit means sufficient to cause deformation of said second conduit means.

2. The insulating gasket as recited in claim 1 wherein said skirt is made of nylon.

3. The insulating gasket as recited in claim 2 wherein said sleeve is made of rubber.

4. The insulating gasket as recited in claim 3 wherein said plastic skirt has a coefficient of friction which is substantially less than the coefficient of friction of said sleeve.

5. The insulating gasket as recited in claim 1 wherein said outer wall of said skirt is accurately shaped from said first skirt end to said remaining skirt end.

6. An insulating and compressive gasket assembly for sealing, insulating and securing a connection of a first conduit means and a second conduit means, said assembly comprising:

a first and second conduit means, said first conduit means having an inner diameter larger than the outer diameter of said second conduit means;

a gasket comprising a substantially tubular sleeve made of a flexible, insulating material, and having an outer wall, and inner wall and two ends;

a skirt consisting essentially of a plastic, nonelastomeric material positioned on said outer wall of said sleeve;

at least a portion of said second conduit means being received by and enclosed by said inner wall of said sleeve;

at least a portion of both the outer wall of said sleeve and said enclosed second conduit means being received by said first conduit means;

said skirt being substantially smaller in length than the length of said sleeve and comprising an outer wall, an inner wall and first and second ends;

said outer wall sloping inwardly in a direction from said first skirt end toward said second skirt end;

a fastening means for securing said first and second conduit means;

said fastening means being adjacent said first end of said skirt while said second skirt end is adjacent said tapered wall of said first conduit means; and whereby upon securement of said first and second conduit means, said sloped wall of said skirt contacts said tapered wall to create a force component along the radial axis of said second conduit means sufficient to cause deformation of said second conduit means.

7. The insulating and compressive gasket as recited in claim 6 wherein said skirt is made of nylon.

8. The insulating gasket assembly as recited in claim 6 wherein said sleeve is made of rubber.

9. The insulating gasket assembly as recited in claim 6 wherein said outer wall of said skirt is accurately shaped from said first skirt end to said remaining skirt end.